United States Patent
Zhang et al.

(10) Patent No.: US 10,255,493 B2
(45) Date of Patent: Apr. 9, 2019

(54) INK LAYOUT ANALYSIS

(71) Applicant: Lenovo (Singapore) Pte. Ltd., Singapore (SG)

(72) Inventors: Jianbang Zhang, Cary, NC (US); Grigori Zaitsev, Durham, NC (US); Steven Richard Perrin, Raleigh, NC (US); Russell Speight VanBlon, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 233 days.

(21) Appl. No.: 14/633,650

(22) Filed: Feb. 27, 2015

(65) Prior Publication Data
US 2016/0253555 A1 Sep. 1, 2016

(51) Int. Cl.
*G06K 9/72* (2006.01)
*G06K 9/00* (2006.01)

(52) U.S. Cl.
CPC .......... *G06K 9/00402* (2013.01); *G06K 9/72* (2013.01)

(58) Field of Classification Search
None
See application file for complete search history.

(56) References Cited

U.S. PATENT DOCUMENTS

| 2004/0146216 A1* | 7/2004 | Andel | G06K 9/342 |
| | | | 382/277 |
| 2014/0119659 A1* | 5/2014 | Sugiura | G06K 9/00416 |
| | | | 382/189 |

OTHER PUBLICATIONS

Tateisi, "Using Stochastic Syntactic Analysis for Extracting a Logical Structure from a Document Image", IEEE 1994.*

* cited by examiner

*Primary Examiner* — Mark Roz
(74) *Attorney, Agent, or Firm* — Ference & Associates LLC

(57) ABSTRACT

One embodiment provides a method, including: accepting, at an input and display device, a plurality of ink strokes; converting the plurality of ink strokes into machine input for analysis; analyzing, using a processor, the machine input to determine a grouping; adjusting, according to the grouping, a layout of at least a sub-set of the plurality of ink strokes determined using a geometric relationship; and providing a display based on the grouping. Other embodiments are described and claimed.

20 Claims, 3 Drawing Sheets

INK LAYOUT ANALYSIS

BACKGROUND

Information handling devices ("devices"), for example cell phones, smart phones, tablet devices, laptop computers, and the like permit users to input handwriting using a finger or pen/stylus. This allows users to write more naturally and without the use of a keyboard.

A handwriting field, box or pane may be presented to the user as an input area for providing the ink strokes, e.g., a rectangle in a lower portion of a touch screen display. In this area the user may provide input handwriting ink strokes, e.g., letters, numbers, characters, symbols, etc. The device employs software that uses the input ink strokes, which are generally presented on screen to provide visual feedback to the user, as input by converting the handwriting ink stroke input locations on the touch screen into machine text according to the language setting of the device. Alternatively, a graphic or image of handwriting input may be placed into an underlying application, e.g., an image of the user's signature, a drawing, etc.

BRIEF SUMMARY

In summary, one aspect provides a method, comprising: accepting, at an input and display device, a plurality of ink strokes; converting the plurality of ink strokes into machine input for analysis; analyzing, using a processor, the machine input to determine a grouping; adjusting, according to the grouping, a layout of at least a sub-set of the plurality of ink strokes determined using a geometric relationship; and providing a display based on the grouping.

Another aspect provides an electronic device, comprising: an input and display device; a processor operatively coupled to the input and display device; and a memory that stores instructions executable by the processor to: accept a plurality of ink strokes; convert the plurality of ink strokes into machine input for analysis; analyze the machine input to determine a grouping; adjust, according to the grouping, a layout of at least a sub-set of the plurality of ink strokes determined using a geometric relationship; and provide a display based on the grouping.

A further aspect provides a product, comprising: a storage device having code stored therewith, the code being executable by a processor of an electronic device and comprising: code that accepts, from an input and display device, a plurality of ink strokes; code that converts the plurality of ink strokes into machine input for analysis; code that analyzes the machine input to determine a grouping; code that adjusts, according to the grouping, a layout of at least a sub-set of the plurality of ink strokes determined using a geometric relationship; and code that provides a display based on the grouping.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
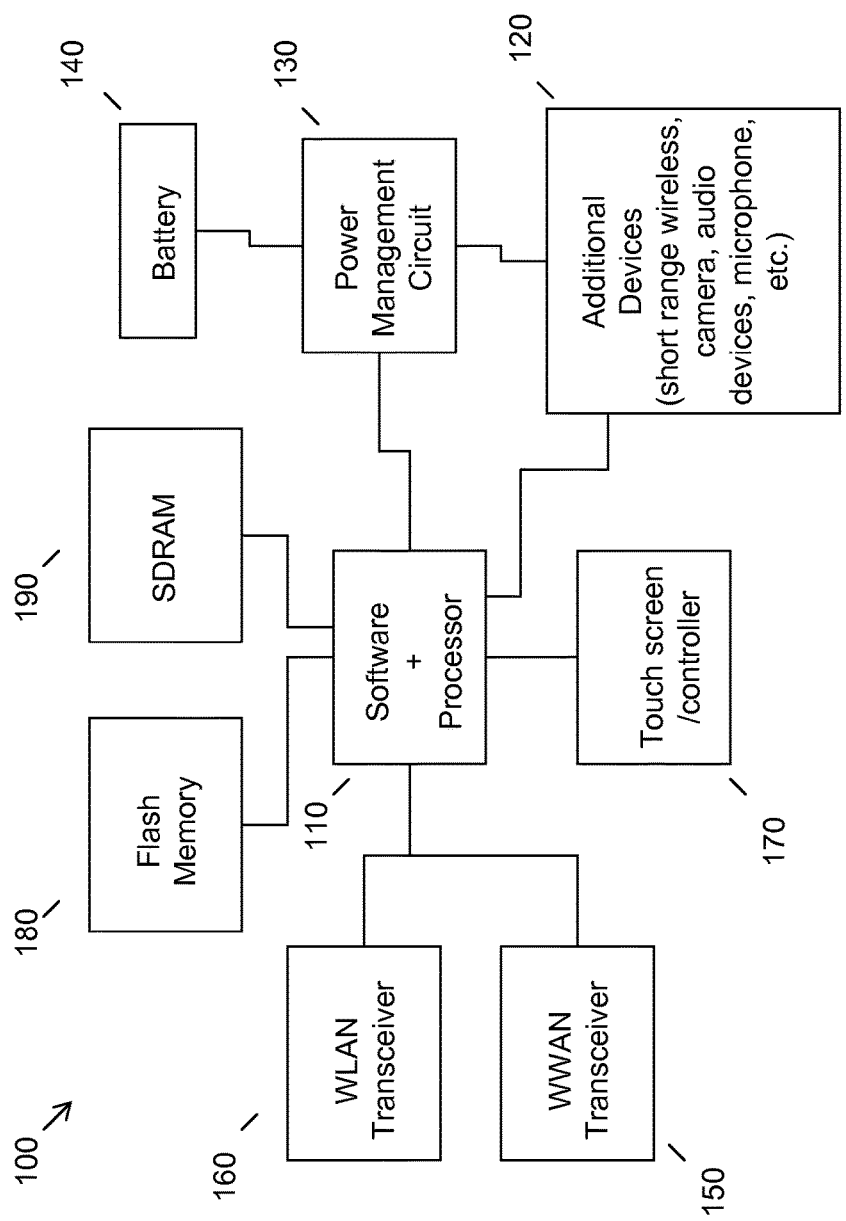
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Using a handwriting input method editor (IME) a user is able to input ink strokes that are converted into text or graphics for insertion into an underlying application. A handwritten document provided to an IME has an implicit layout, e.g., paragraph, text lines, word arrangement. However, with currently IME technology, only the two dimensional (2D) geometry of the ink strokes is used to build or inform the layout. That is, the 2D relationship between components (ink strokes forming letters, words, lines, etc.) is used to build the layout of the document.

An issue with this approach is that it often produces an input document layout (or portion thereof) that does not match the user's intent. For example, if the distance between two lines of ink strokes does not meet a predefined distance threshold within the IME programming, the IME will not recognize these lines as being associated and thus the lines will not be considered as children of one paragraph. While this may be correct, often a user does not understand what the threshold distance is and thus lines that are logically associated with one another (in the view of the user) are nonetheless separated by the IME, e.g., even though the lines actually represent one logical sentence.

This technical issue presents problems for a user in that the user is forced to repeatedly re-input or modify previous inputs that are not properly handed by the IME. This detracts from the user's overall experience and tends to make users shy away from using handwriting IME programs.

Accordingly, an embodiment provides an improvement in IME technology such that the input ink strokes are handled more closely to the user's original intent. This cuts down on the need to repeat inputs or edit prior inputs that have been mishandled by the program. Among other things, such techniques improve the quality of the IME such that the user's input experience is more closely matched to using physical paper.

By way of example, an embodiment uses a program (e.g., grammar check program, regular expression checking program, and/or natural language processing (NLP) program) to supplement an IME's use of 2D geometry to resolve the input ink strokes relationship and thus layout. By integrating such a supplemental function, e.g., a grammar check, regular expression check and/or natural language processing, multiple words can be identified as one logical sentence or phrase, even if not grouped using a geometric relationship. If identified as a logical phrase or grouping, these ink strokes are grouped together as children of a parent component, e.g., words are included in a line, sentence and/or paragraph. An embodiment may also de-group words that are not logically associated, even if their 2D relationship suggests otherwise.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additional devices 120 are commonly included, e.g., a camera, short range wireless devices, a microphone, etc. System 100 often includes a touch screen 170 for data input and display/rendering, which may include programming such as described herein for processing ink strokes into machine input and analysis of the same using various programs such as grammar checking programs, natural language processing programs, and/or pattern or expression identification programs. System 100 also typically includes various memory devices, for example flash memory 180 and SDRAM 190.

Figure 2:
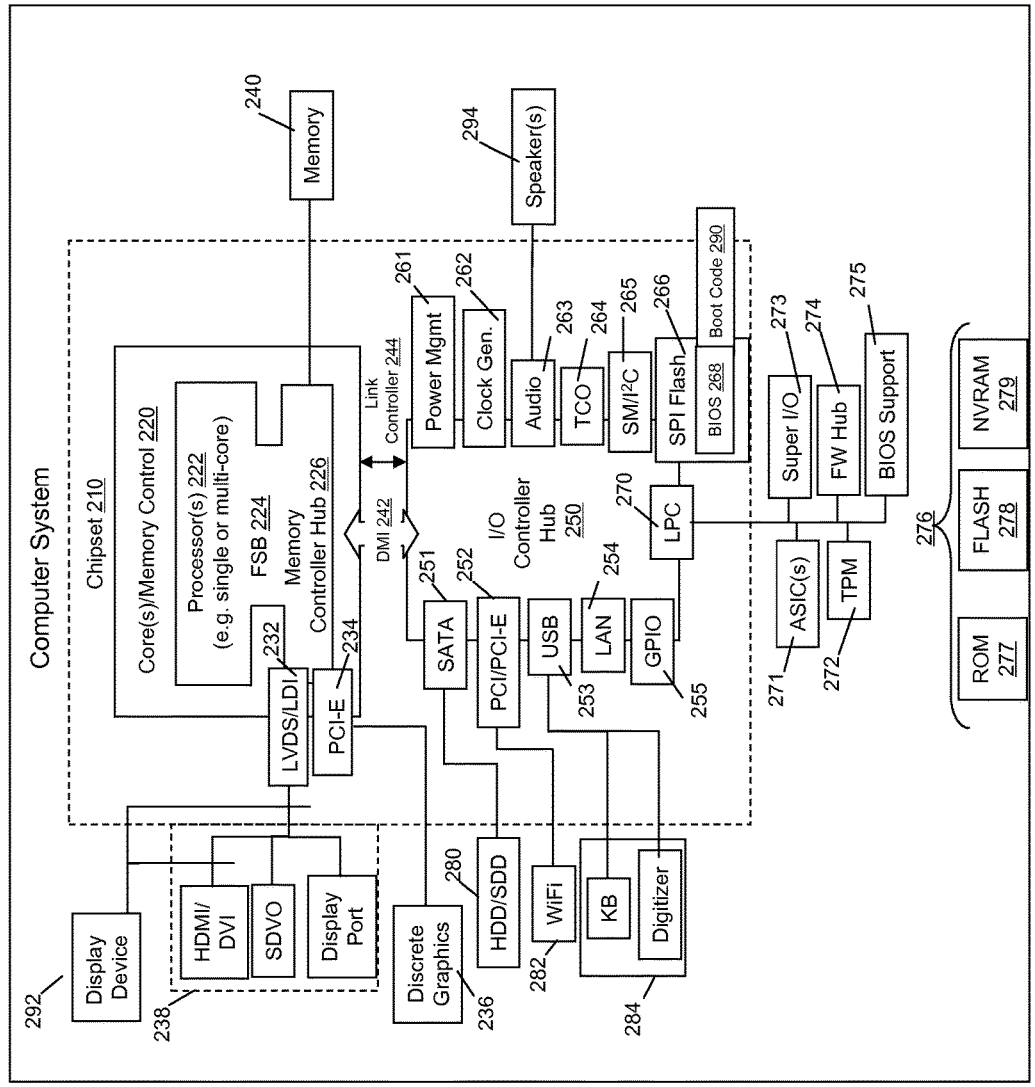
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries.

The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in electronic devices such as tablets, smart phones, personal computer devices generally, and/or other electronic devices. Users may employ these electronic devices for various functions, e.g., inputting handwriting ink strokes as an input modality to an internet search application, an email application, a text messaging or instant messaging application, a word processing application, an e-signature application, inputting handwriting ink strokes to fillable forms, a drawing application, etc. For example, the circuitry outlined in FIG. 1 may be implemented in a tablet or smart phone embodiment, whereas the circuitry outlined in FIG. 2 may be implemented in a laptop personal computer embodiment. In each case, the device may include an input and display device, e.g., a touch screen or the like, which acts to accept ink strokes and provides visual displays of input characters, as well as components to convert handwritten characters or strokes into machine input (e.g., machine text), input strokes as graphics or images, convert ink strokes to gesture commands, and the like.

Figure 3:
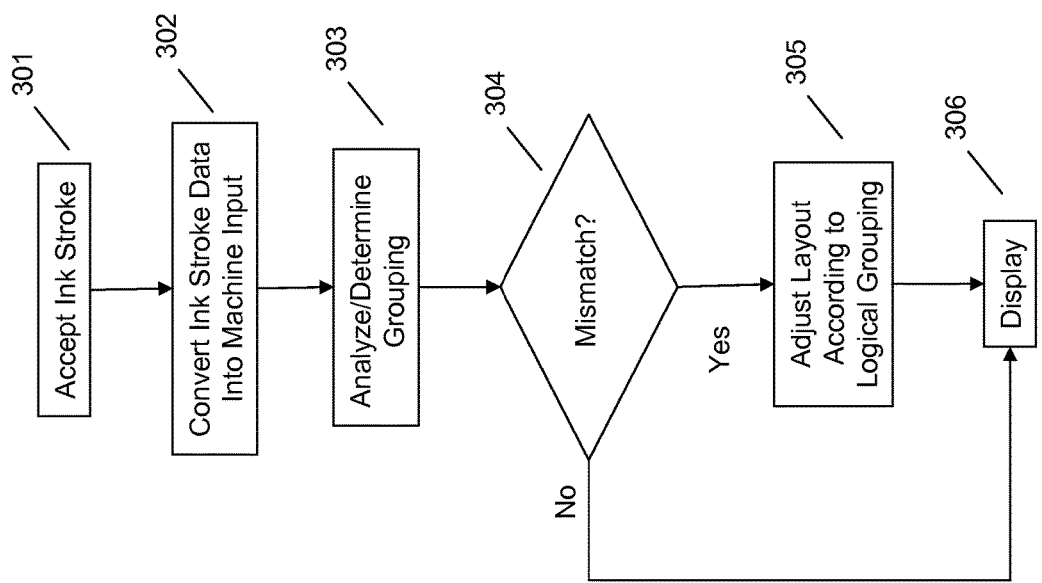
FIG. 3 illustrates an example method of ink layout analysis.

As illustrated in FIG. 3 an embodiment provides a method by which ink stroke layout may be improved by analyzing the input ink strokes to determine if they should or should not be logically grouped. By way of example, a plurality of ink strokes are input to an input and display device, such as a touch screen display, at 301. A processing engine or system, e.g., a handwriting input application running on the device, converts the plurality of ink strokes into machine input for analysis at 302. For example, if a stylus is used to provide ink strokes to a touch screen display device, the coordinates of the ink strokes may be analyzed to produce characters (e.g., letters) that are formed into machine representations for processing, e.g., by a spelling and grammar program, an NLP program, or an expression program.

This permits an embodiment to not only analyze the 2D relationship of the ink strokes, e.g., formed into lines of paragraph(s), but also allows an embodiment to process and analyze the machine input to determine a logical grouping at 303. An embodiment thus facilitates a refined analysis of the input ink strokes such that common grouping mistakes made by conventional IMEs are corrected or avoided.

By way of illustration, if an embodiment detects a grouping indicated by a 2D relationship of the ink strokes (e.g., certain ink strokes are grouped to a line due to their closeness in the input space) that does not match their logical grouping (e.g., these same ink strokes, while close in 2D input space, are not part of a logical phrase or sentence). If such a mismatch is determined, in one embodiment, the logical grouping may be used to override the 2D grouping such that the geometrically determined layout is adjusted.

Thus, as illustrated, if there is a mismatch determined at 304, an embodiment may implement a logical grouping of the ink strokes such that the layout is adjusted at 305 according to the logical grouping rather than simply using the grouping determined using a geometric relationship. If the logical grouping and the geometric grouping match, an embodiment may not adjust the layout of the ink strokes as displayed at 306.

The layout is thus determined with the aid of logical analysis of the ink strokes such that a display of the plurality of ink strokes on the input and display device is presented at 306. This corresponds to how the inks strokes are presented in the display in terms of paragraphing, line spacing, formation of expressions, etc. The layout determined according to an embodiment, including any adjustments, may be applied to the graphic representation of the ink strokes and/or applied to a converted form of the ink strokes, e.g., typeset derived from the handwriting input as provided by an underlying application.

The adjusting at 305 may include grouping a sub-set of the plurality of ink strokes not associated using a geometric relationship. The adjusting at 305 may also include de-grouping a sub-set of the plurality of ink strokes grouped using a geometric relationship.

In an embodiment, the analyzing at 303 may include using a grammar check program to determine a logical grouping. For example, the grammar check may identify ink strokes representing a logical sentence, and the adjusting at 305 may therefore include grouping ink strokes included in the logical sentence as children in a text line of a paragraph. Thus, if recognized results fit certain grammar rule (e.g., noun+verb, punctuation between words, etc.), they can be grouped.

In an embodiment, the analyzing at 303 may include using natural language processing to determine a grouping. For example, natural language processing may identify a logical phrase, and the adjusting at 305 may include grouping ink strokes included in the logical phrase as children in a text line of a paragraph. By way of example, if recognized results are identified as natural language, e.g., idiom or phrase, they can grouped together.

In an embodiment, the analyzing at 303 may include identifying a predetermined expression within the plurality of ink strokes. For example, the predetermined expression may be a template to which ink strokes forming a pattern are matched, and the adjusting at 305 may thus include formatting the ink strokes into the pattern template. Thus, if recognized results fit a predefined regular expression rule such as "A: B–C," or a mathematical expression or formula format, they can be grouped together.

Based on the examples included herein, an embodiment may detect if a collection of ink strokes should be grouped as one component or de-grouped. If multiple components are considered as one group, even if a geometry check condition is not met, they may still be grouped together. If multiple components (ink strokes) are already grouped by using a geometry check, while they are actually not logically grouped or associated, e.g., by using a grammar check, a regular expression check and/or NLP, they may be de-grouped to separate components in the layout.

Several concrete examples to demonstrate such processing include, but are not limited to, the following. An embodiment may determine if words fit into one logical phrase or sentence, and group them as children words of one text line, even if they are geometrically far apart. An embodiment may determine if the last few words of one geometric text line and the first few words of the next geometric text line fit into one logical phrase or sentence, and if so, group these two text lines as children lines of one paragraph. An embodiment may determine if two lines are considered as children of one paragraph because they are vertically very close to each other, while they are not logical to be children of one paragraph, and de-group these into separate paragraphs.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions that are executed by a processor and stored on a device readable storage medium, referred to herein as a non-signal storage device. A non-signal storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a non-signal storage device is not a signal, is non-transitory, and "non-transitory" includes all media except signal media.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a special purpose information handling device or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
    accepting, at an input and display device, a plurality of ink strokes;
    converting the plurality of ink strokes into machine input for analysis;
    determining, using a processor, a grouping of the machine input, wherein the grouping is based upon identifying a geometric relationship between at least a sub-set of the machine input and identifying a syntactic grouping comprising a logical phrase of the at least a sub-set of the machine input, wherein the syntactic grouping overrides the geometrical grouping in the case of mismatch between the syntactic grouping and the geometrical grouping;
    adjusting, according to the grouping, a layout of at least a sub-set of the plurality of ink strokes corresponding to the at least a sub-set of the machine input; and
    providing a display based on the grouping.

2. The method of claim 1, wherein the adjusting comprises grouping a sub-set of the plurality of ink strokes not associated using a geometric relationship.

3. The method of claim 1, wherein the adjusting comprises de-grouping a sub-set of the plurality of ink strokes grouped using a geometric relationship.

4. The method of claim 1, wherein the analyzing comprises using a grammar check program to determine the syntactic grouping.

5. The method of claim 4, wherein:
    the grammar check identifies ink strokes representing the logical phrase; and
    the adjusting comprises grouping ink strokes included in the logical phrase in a paragraph.

6. The method of claim 1, wherein the analyzing comprises using natural language processing to determine the syntactic grouping.

7. The method of claim 6, wherein:
    the natural language processing identifies the logical phrase; and
    the adjusting comprises grouping ink strokes included in the logical phrase in a paragraph.

8. The method of claim 1, wherein the analyzing comprises identifying a predetermined expression within the plurality of ink strokes.

9. The method of claim 8, wherein:
    identifying a predetermined expression includes matching ink strokes to a pattern template; and
    the adjusting comprises formatting the ink strokes into the pattern template.

10. The method of claim 1, wherein the providing a display of the plurality of ink strokes on the input and display device comprises displaying machine text representing the ink strokes.

11. An electronic device, comprising:
    an input and display device;
    a processor operatively coupled to the input and display device; and
    a memory that stores instructions executable by the processor to:
    accept a plurality of ink strokes;
    convert the plurality of ink strokes into machine input for analysis;
    determine a grouping of the machine input, wherein the grouping is based upon identifying a geometric relationship between at least a sub-set of the machine input and identifying a syntactic grouping comprising a logical phrase of the at least a sub-set of the machine input, wherein the syntactic grouping overrides the geometrical grouping in the case of mismatch between the syntactic grouping and the geometrical grouping;
    adjust, according to the grouping, a layout of at least a sub-set of the plurality of ink strokes corresponding to the at least a sub-set of the machine input; and
    provide a display based on the grouping.

12. The electronic device of claim 11, wherein to adjust comprises grouping a sub-set of the plurality of ink strokes not associated using a geometric relationship.

13. The electronic device of claim 11, wherein to adjust comprises de-grouping a sub-set of the plurality of ink strokes grouped using a geometric relationship.

14. The electronic device of claim 11, wherein to analyze comprises using a grammar check program to determine the syntactic grouping.

15. The electronic device of claim 14, wherein:
the grammar check identifies ink strokes representing the logical phrase; and
to adjust comprises grouping ink strokes included in a text line of a paragraph.

16. The electronic device of claim 11, wherein to analyze comprises using natural language processing to determine the syntactic grouping.

17. The electronic device of claim 16, wherein:
the natural language processing identifies the logical phrase; and
to adjust comprises grouping ink strokes included in the logical phrase in a paragraph.

18. The electronic device of claim 11, wherein to analyze comprises identifying a predetermined expression within the plurality of ink strokes.

19. The electronic device of claim 18, wherein:
identifying a predetermined expression includes matching ink strokes to a pattern template; and
to adjust comprises formatting the ink strokes into the pattern template.

20. A product, comprising:
a storage device having code stored therewith, the code being executable by a processor of an electronic device and comprising:
code that accepts, from an input and display device, a plurality of ink strokes;
code that converts the plurality of ink strokes into machine input for analysis;
code that determines a grouping of the machine input, wherein the grouping is based upon identifying a geometric relationship between at least a sub-set of the machine input and identifying a syntactic grouping comprising a logical phrase of the at least a sub-set of the machine input, wherein the syntactic grouping overrides the geometrical grouping in the case of mismatch between the syntactic grouping and the geometrical grouping;
code that adjusts, according to the grouping, a layout of at least a sub-set of the plurality of ink strokes corresponding to the at least a sub-set of the machine input; and
code that provides a display based on the grouping.

* * * * *